United States Patent
Campana et al.

(10) Patent No.: US 7,571,167 B1
(45) Date of Patent: Aug. 4, 2009

(54) PEER-TO-PEER NETWORK CONTENT OBJECT INFORMATION CACHING

(76) Inventors: David Anthony Campana, 24 Caraway Ct., Princeton, NJ (US) 08540; Brendan Gregory Elliott, 22 Witherspoon La., Princeton, NJ (US) 08542; James Albert Johanson, III, 292 Lexington Rd., Schwenksville, PA (US) 19473; Carlos Eduardo Ramirez, 1340 N. Bradford Rd., Newtown, PA (US) 18940

( * ) Notice: Subject to any disclaimer, the term of this patent is extended or adjusted under 35 U.S.C. 154(b) by 633 days.

(21) Appl. No.: 10/868,110

(22) Filed: Jun. 15, 2004

(51) Int. Cl.
G06F 17/30 (2006.01)
G06F 7/00 (2006.01)

(52) U.S. Cl. .................................. 707/10; 707/204

(58) Field of Classification Search .................. 707/10, 707/206, 3, 204; 715/731; 705/51; 711/135
See application file for complete search history.

(56) References Cited

U.S. PATENT DOCUMENTS

| | | | |
|---|---|---|---|
| 6,546,464 B2 * | 4/2003 | Fortuna et al. ............... | 711/141 |
| 7,089,301 B1 * | 8/2006 | Labio et al. .................. | 709/224 |
| 7,155,676 B2 * | 12/2006 | Land et al. | |
| 2002/0143944 A1 | 10/2002 | Traversat et al. | |
| 2002/0184310 A1 | 12/2002 | Traversat et al. | |
| 2002/0184357 A1 | 12/2002 | Traversat et al. | |
| 2003/0046239 A1 * | 3/2003 | Geilfuss et al. ............... | 705/51 |
| 2003/0073497 A1 * | 4/2003 | Nelson | |
| 2003/0120751 A1 * | 6/2003 | Husain et al. ............... | 709/219 |
| 2003/0135591 A1 * | 7/2003 | Chetuparambil et al. .... | 709/220 |
| 2004/0041836 A1 * | 3/2004 | Zaner et al. .................. | 345/751 |
| 2004/0088376 A1 * | 5/2004 | McCanne et al. ........... | 709/219 |
| 2004/0139097 A1 * | 7/2004 | Farber et al. ................. | 707/100 |
| 2004/0220926 A1 * | 11/2004 | Lamkin et al. .................. | 707/3 |
| 2005/0055512 A1 * | 3/2005 | Kishi ......................... | 711/135 |
| 2005/0114784 A1 * | 5/2005 | Spring et al. | |
| 2005/0216671 A1 * | 9/2005 | Rothman et al. ............ | 711/137 |
| 2006/0155980 A1 * | 7/2006 | Bodlaender ................. | 713/100 |
| 2006/0168318 A1 * | 7/2006 | Twiss ......................... | 709/238 |

OTHER PUBLICATIONS

Yasser Rasheed et al., High-Quality Media Distribution in the Digital Home, Intel® Technology Journal, Interoperable Home Infrastructure, Nov. 15, 2002, pp. 17-29 vol. 06, Issue 04, http://developer.intel.com/technology/itj/index.htm.

* cited by examiner

*Primary Examiner*—Kuen S Lu
(74) *Attorney, Agent, or Firm*—Stolowitz Ford Cowger LLP (57) ABSTRACT

In a peer-to-peer network system, a local node communicates with a remote node on which detailed information about content objects resides and optionally, the content objects reside. The local node uses caching, message request resizing and predictive message requesting to speed response time to user requests and internal control node requests.

19 Claims, 9 Drawing Sheets

PEER-TO-PEER NETWORK CONTENT OBJECT INFORMATION CACHING

FIELD OF THE INVENTION

The present invention is directed to caching remote directory information and media content in a peer-to-peer network, and in particular to a method that caches such directory information in response to requests for specific items of the directory information.

BACKGROUND

The increased use of electronic devices, such as digital cameras, DVDs, PCs, wireless Personal Digital Assistants (PDAs), stereos and TVs has resulted in increased interest in networking these devices, particularly in a home environment. Devices such as television receivers (TVs) and stereos can act as "players" to play content while devices like digital versatile disc (DVD) players, personal computers (PCs) and video cameras can act as sources of content termed "receivers." Networking these devices allows content from a networked receiver node to play on a networked player node provided the nodes support a common content format and protocol. Further, node devices can support both player and receiver functionality. For example, a PC, that is connected to a global information network such at the Internet, can receive on-line content from the network for rendering on a remote node player. When equipped with DVD player software, this same PC allows DVD content to play on the PC. Applying this example to a home environment, a networked DVD receiver node located in the den, and typically used with the den TV, can provide content that is reproduced on a PC located in the master bedroom. In this home example, a master bedroom DVD is unnecessary. Accordingly, sharing content on the network can reduce the need for multiple receiver devices and players throughout the home.

There are several peer-to-peer network descriptions that both support player and receiver nodes. Ease of use is especially desirable in the home environment. Available content and node capabilities are desirably discoverable by other nodes. Moreover, it may be desirable to have a master controller for directing a specific content from one receiver node on the network to a networked player node.

Among the peer-to-peer network descriptions providing these features is Universal Plug and Play (UPnP). UPnP provides services to enumerate available content available on the network. UPnP Context Directory Service (CDS) allows users to browse descriptions of content available to network nodes. Further, users can search content for certain attributes such as a movie title. User interfaces on controller nodes provide user access to CDS functionality on local and remote nodes.

While the CDS capabilities support such remote browsing and searching, the user experience may be less than desirable. During high network traffic periods, browsing and searching across the network often results in a sluggish user experience.

SUMMARY OF THE INVENTION

The present invention relates to a peer-to-peer network system and methods of reducing network requests for network data thereby avoiding network delays and reducing the sluggish response experienced by users. Further, the present invention reduces response time for network requests originating within the local node. In one aspect of the invention, a local network node maintains a cache of content object information from prior data requests that were received by the local node. In another aspect of the invention, content object information is requested across the network only if it is not already stored in the local node cache memory. In yet another aspect of the invention, the local node resizes a request for content object information to cause a larger amount of the object information than was requested to be retrieved and stored in the cache memory. According to yet another aspect of the invention, the local node anticipates a future request for content object information based on past requests, requests the anticipated remote data before it is actually requested and then caches the content object information when it is received.

DESCRIPTION OF THE INVENTION

The present invention is embodied in a peer-to-peer network system with receiver and control nodes. Nodes on the network support at least one of the following logical functions: content player, content receiver and controller. Utilizing the terminology of UPnP, these logical functions are referred to as Media Renderer, Media Server and Control Point respectively.

Media Servers expose media content to network nodes, access media content and report on the available media content. Additionally, most Media Servers store content. Requests for available media content information are provided by a set of services, termed Content Directory Services (CDS), on the Media Server.

Media Renderers receive media content and render the content locally on the node. Depending on the Media Renderer capabilities, information regarding available media content may also be rendered.

Control Points ensure that specific content exposed by a Media Server can be rendered on a selected Media Renderer. To do so, the Control Point queries for a protocol and format common to both the Media Renderer and Media Server then configures the Media Renderer and Media Server for the content transfer. Optionally, a Control Point provides user interface functionality to service end user requests for information of available media content and content selection. Further, user requests for Media Renderer adjustments, such as volume control, and play control such as Play, Stop and Seek functions are processed by the Control Point.

As described below, UPnP CDS services maintain content object information for the content data on or accessible to the server. In existing systems, each media server maintains its own content directory and any request for specific content or content object information is received and satisfied by the server on which the requested content or content object information resides. Briefly, the present invention expands the CDS services by maintaining cache memories of a portion of the CDS information, for example, the content object information, in one or more of the devices on the networks. According to an exemplary embodiment of the invention, each of these devices maintain a list of content object information for content object information that the device has previously requested or that is likely to be requested soon. When the device requests content object information that is already in the local cache memory, the device may access the content immediately from the cache memory. In an alternative embodiment of the invention, because the devices maintain local copies of previously requested content object information in their cache memories, one device may be able to satisfy a request for content object information from another device, so that the other device does not need to access the CDS of the server.

Figure 1:
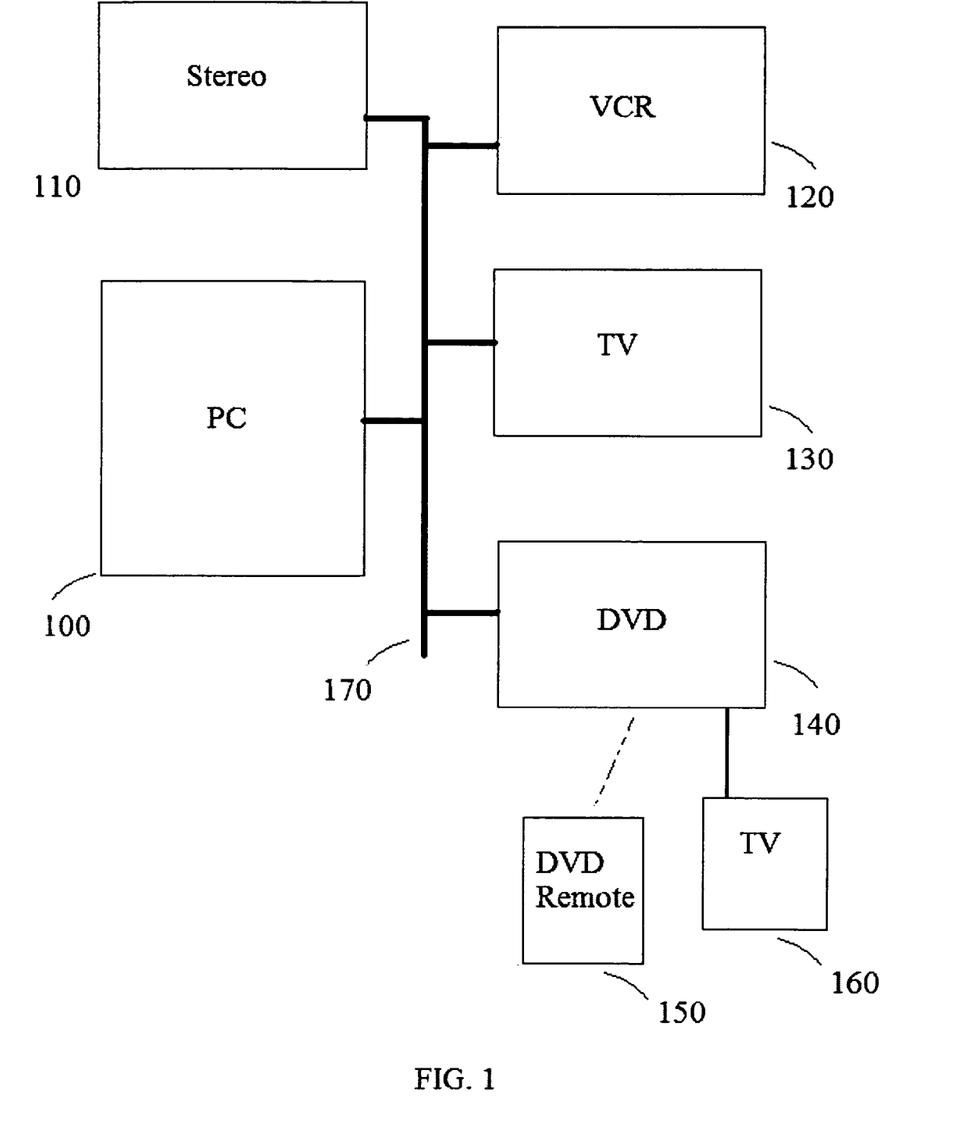
FIG. 1 is a block diagram of an exemplary peer-to-peer networking system.

FIG. 1 shows a configuration of a peer-to-peer system with nodes having the functionality of players, receivers and controllers or a combination thereof. Peer-to-peer network 170 connects personal computer 100, stereo 110, video cassette recorder (VCR) 120, networked TV 130 and DVD 140. DVD 140 interfaces with wireless DVD remote 150 and connected TV 160. Stereo 110 is a Media Renderer for playing audio media and optionally a Media Server for audio content. Similarly TV 130 is a Media Renderer for video display and optionally a Media Server for video content received, for example, via an RF, cable or satellite tuner. VCR 120 is a Media Server as it provides VCR content to the network. In the exemplary configuration, DVD 140 serves three functions: it is a Control Point servicing user input from DVD Remote 150, it is a Media Renderer by rendering video content and user requested output to direct connected TV 160 and it is a Media Server for DVD content. PC 100 is a Media Server but optionally provides Media Rendering functions. PC 100 may provide Control Point functionality supporting a user interface on PC 100.

Figure 2:
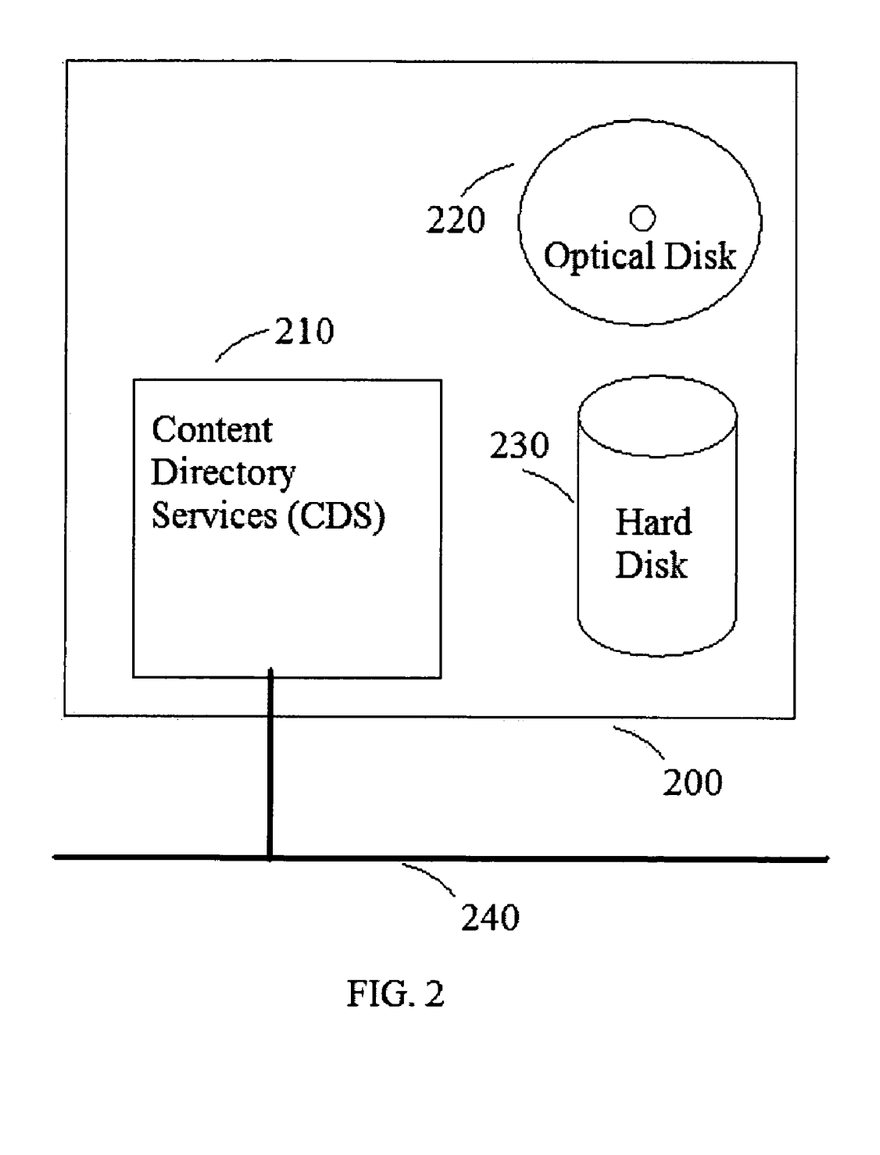
FIG. 2 is a block diagram of an exemplary remote media server for the peer-to-peer networking system shown in FIG. 1.

FIG. 2 shows a block diagram of a node supporting Media Server functionality connected to network 240. As a node with this functionality, node 200 provides Content Directory Services (CDS) 210 for exposing content accessible to node 200. Content exposed by the CDS may include a single content "item" such as a song or a "container" for a group of content items such as a collection of songs along with the associated song play list. Collectively, content items and content containers are termed "content objects." Content objects may also contain "metadata." The metadata is detailed information that may include the formats and protocols supported for the object, a play list for a content container, information as to the title, artist, publisher, provider of the content object and other information. This metadata or parts of it is referred to as "content object information." CDS 210 provides content object information to requesting network nodes. Moreover, CDS 210 performs browsing of control object information presented in a hierarchical directory structure similar to that of a file directory on a computer. Not only can CDS 210 traverse the directory structure, it can also search the content object information for specific information such as a song by title. UPnP CDS further provides for event subscription, event notification and status polling thereby enabling Control Points to recognize changes in the CDS content object information changes.

Optical disk 220 and hard disk 230 are optional sources of content on node 200. Node 200 need not store the actual content objects referenced by the content object information. The content objects need only be accessible to node 200. Accordingly, CDS 210 can contain a virtual directory of content object information that is to say, content object information that points to the content on another server. CDS 210 can aggregate content object information exposed by remote nodes connected to network 240 as well as sources outside network 240. Further, virtual directories can be ordered by other criteria. For example, a specific content provider may desire a distinctive display of its content object information.

Figure 3:
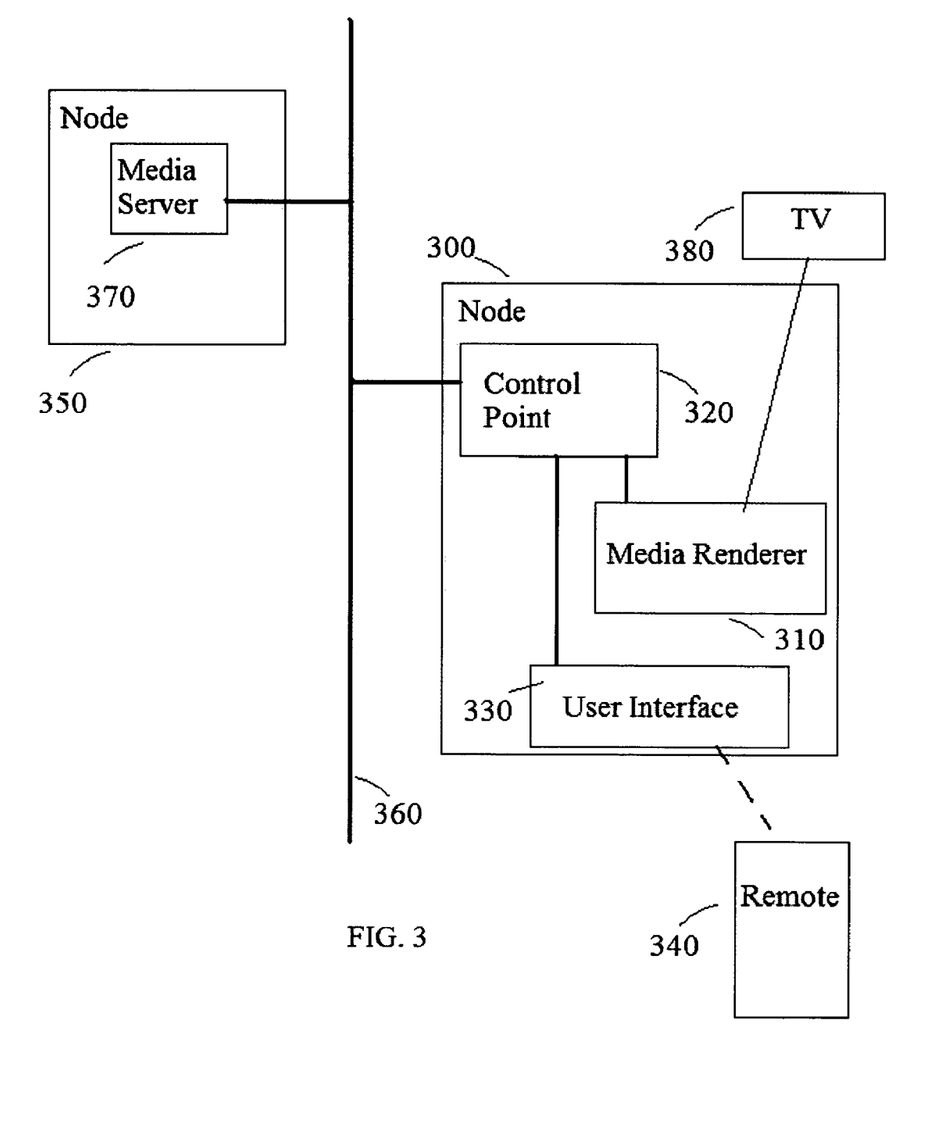
FIG. 3 is a block diagram of an exemplary peer-to-peer networking system having a server node and control node with user interface.

FIG. 3 is a block diagram that shows one UPnP network configuration consistent with aspects of the present invention. Node 350 and node 300 are connected via network 360. Network node 350 includes Media Server 370 functionality and, as described above, optionally Media Renderer and/or Control Point functionality. Node 300 provides a user interface by receiving user input requests from remote control unit 340 and displaying the requested information on TV 380. The exemplary TV 380 may display content object information in addition to rendering the content. Media Renderer 310 directs content to TV 380. Media Render 310 can be integrated with Control Point 320 such that remote nodes render to TV 380 only through Control Point 320. Alternatively, Media Render 310 can be exposed to network 360 allowing other Control Points to render to TV 380, bypassing Control Point 320.

Navigation and selection input means on remote 340 allow a user to browse and search content directories as well as select content for play. Content control input means which may be operated to stop, play and start content rendering can also be provided. Examples of such input means include, without limitation, touch screens, buttons, jog wheels, touch pads, joysticks and mice. User input signals from remote control unit 340 are transmitted to user interface task 330. Task 330 manages the user interface and issues data requests based on the user input signals, the capabilities of the output device TV 380, and the current display state of the output device. The request is sent to Control Point 320 and display data is transmitted to Media Renderer 310 for display on TV 380.

Figure 4:
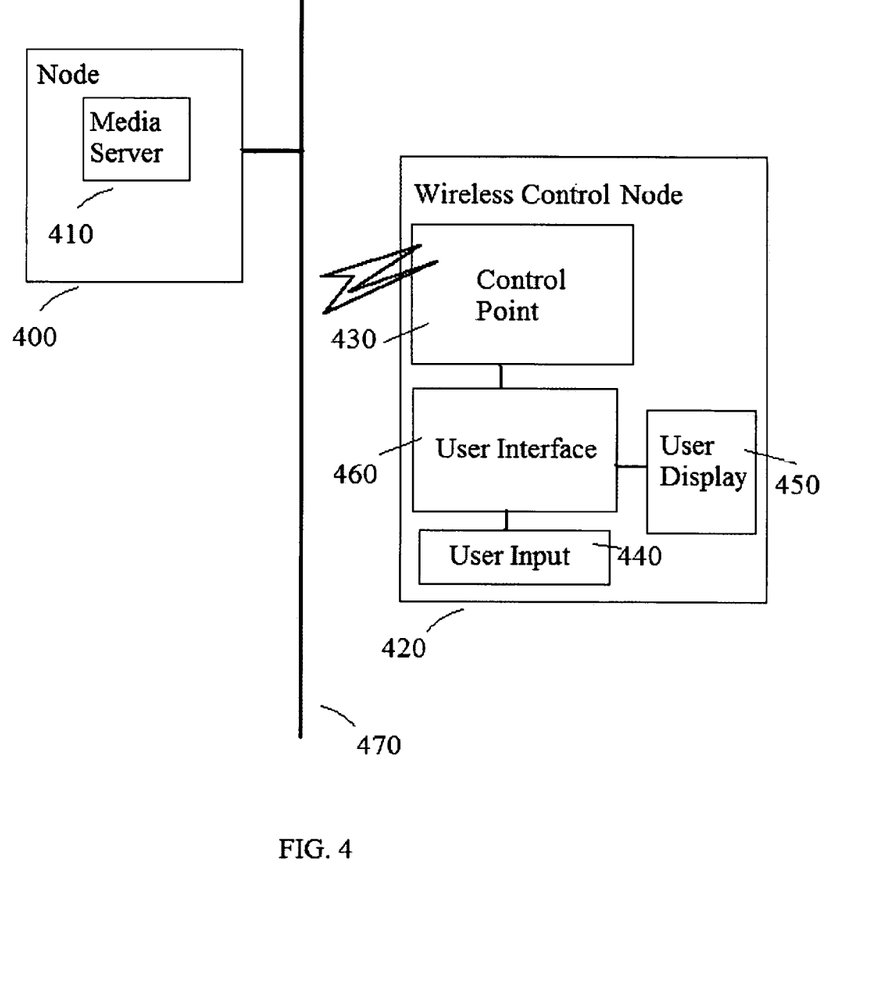
FIG. 4 is a block diagram of an exemplary peer-to-peer networking system having a server node and wireless control node with user interface.

Another UPnP configuration consistent with aspects of the present invention is shown in FIG. 4. Node 400 has Media Server 410 functionality similar to that node 350 of FIG. 3 described above. Unlike node 300 of FIG. 3, wireless control node 420 receives user request from an integrated user input device 440 and displays information on integrated user display 450. Typically, such a wireless control node may be a hand-held device with a small display screen that also provides input means. Alternatively, the display and input means may be separate. Examples of some input means include, without limitation, touch screens, buttons, jog wheels, touch pads, joysticks and mice. Management of user display 450 and user input device 440 is performed by user interface task 460. Upon receipt of user input, task 460 generates a data request based on data provided by the user through the input device 440, the capabilities of user display 450 and the current display state. Optionally, task 460 functionality is incorporated into Control Point 430.

Figure 5:
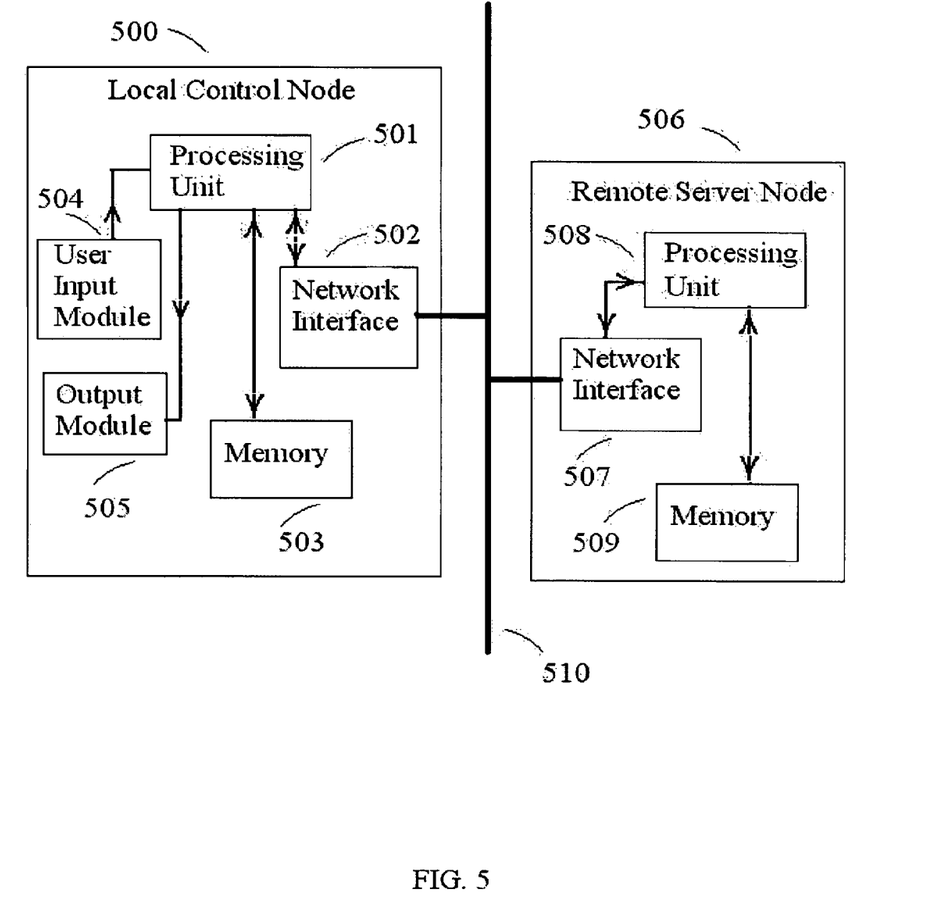
FIG. 5 is a block diagram of an exemplary peer-to-peer networking system suitable for use in the present invention.
Figure 6:
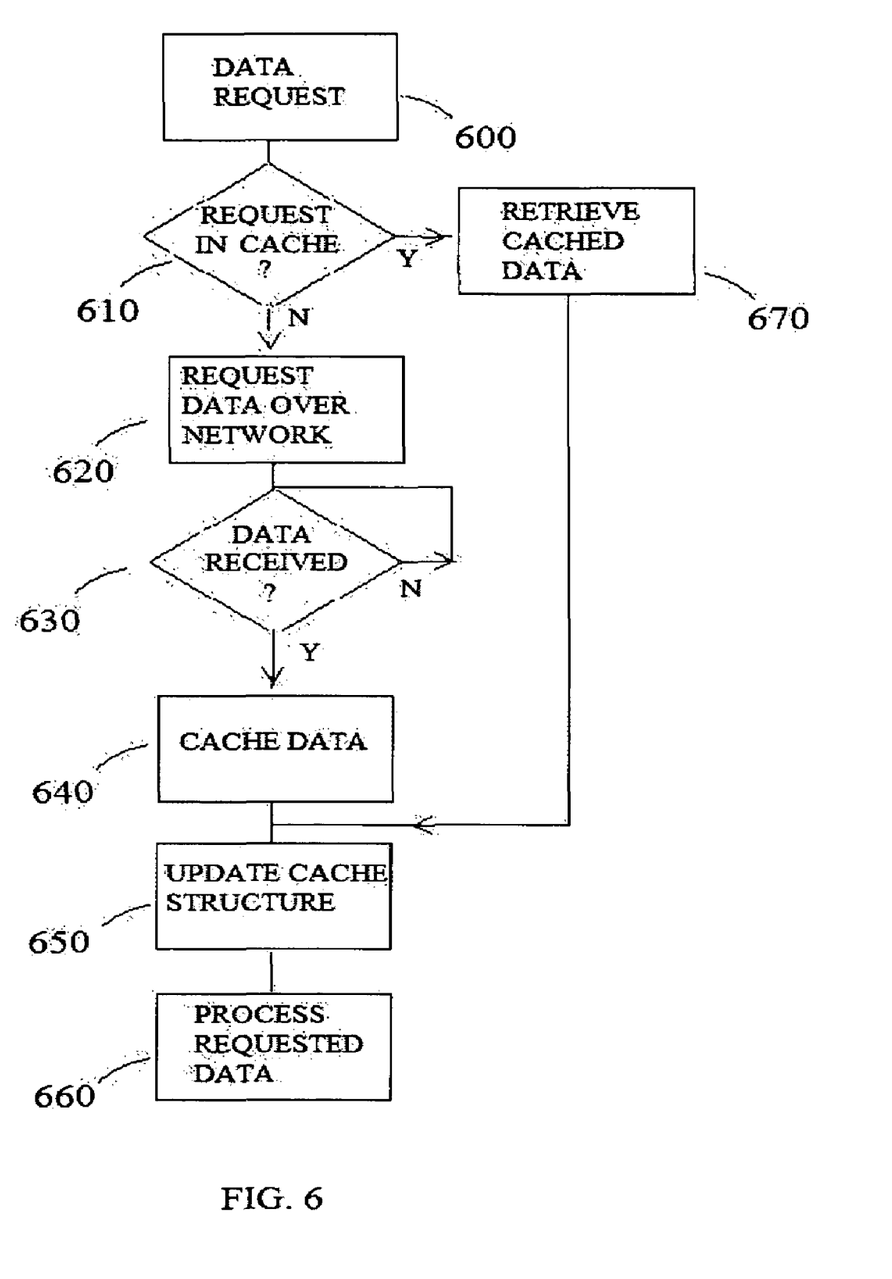
FIG. 6 is a flow-chart diagram useful in describing remote data caching.
Figure 7:
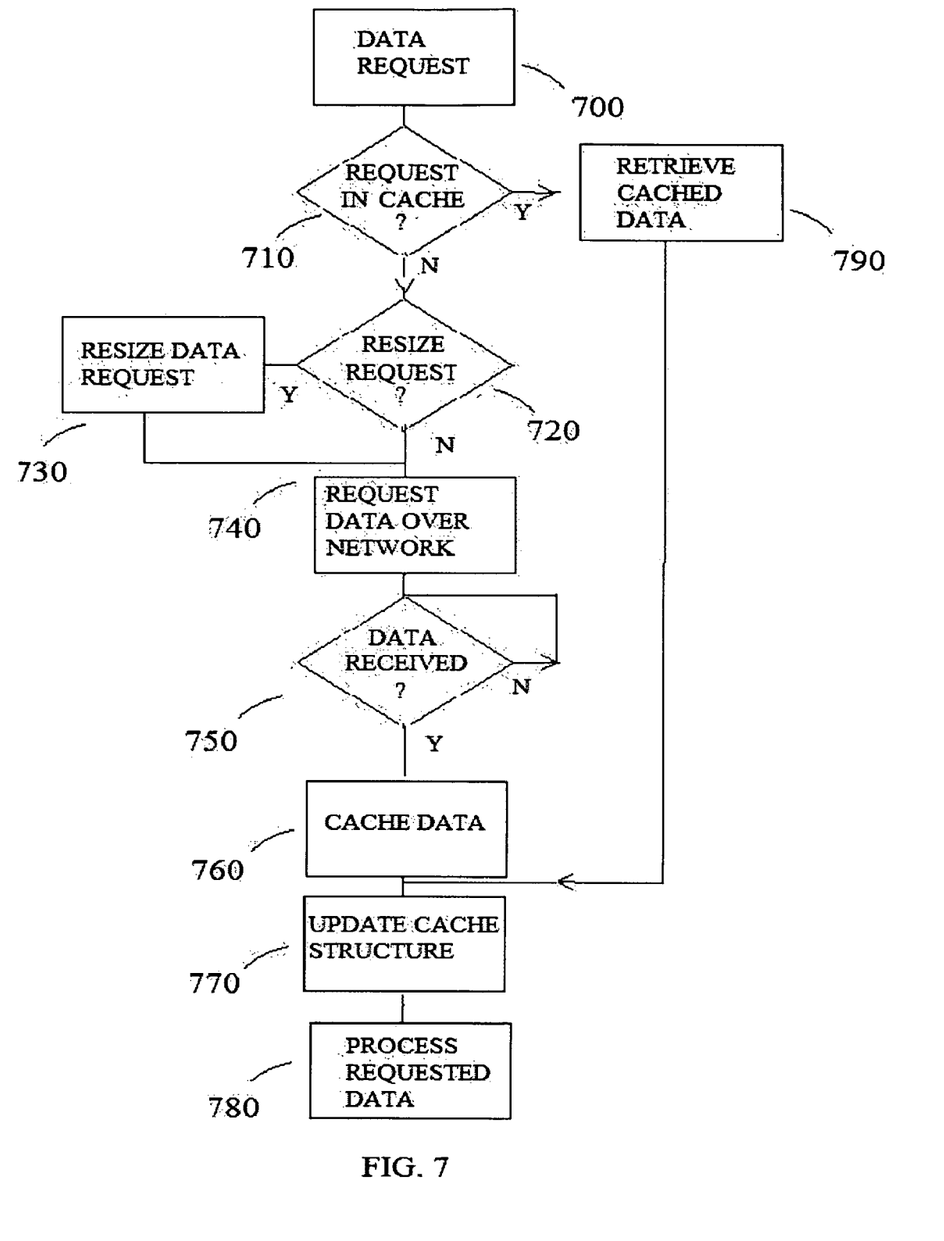
FIG. 7 is a flow-chart diagram useful in describing resizing a data request.
Figure 8:
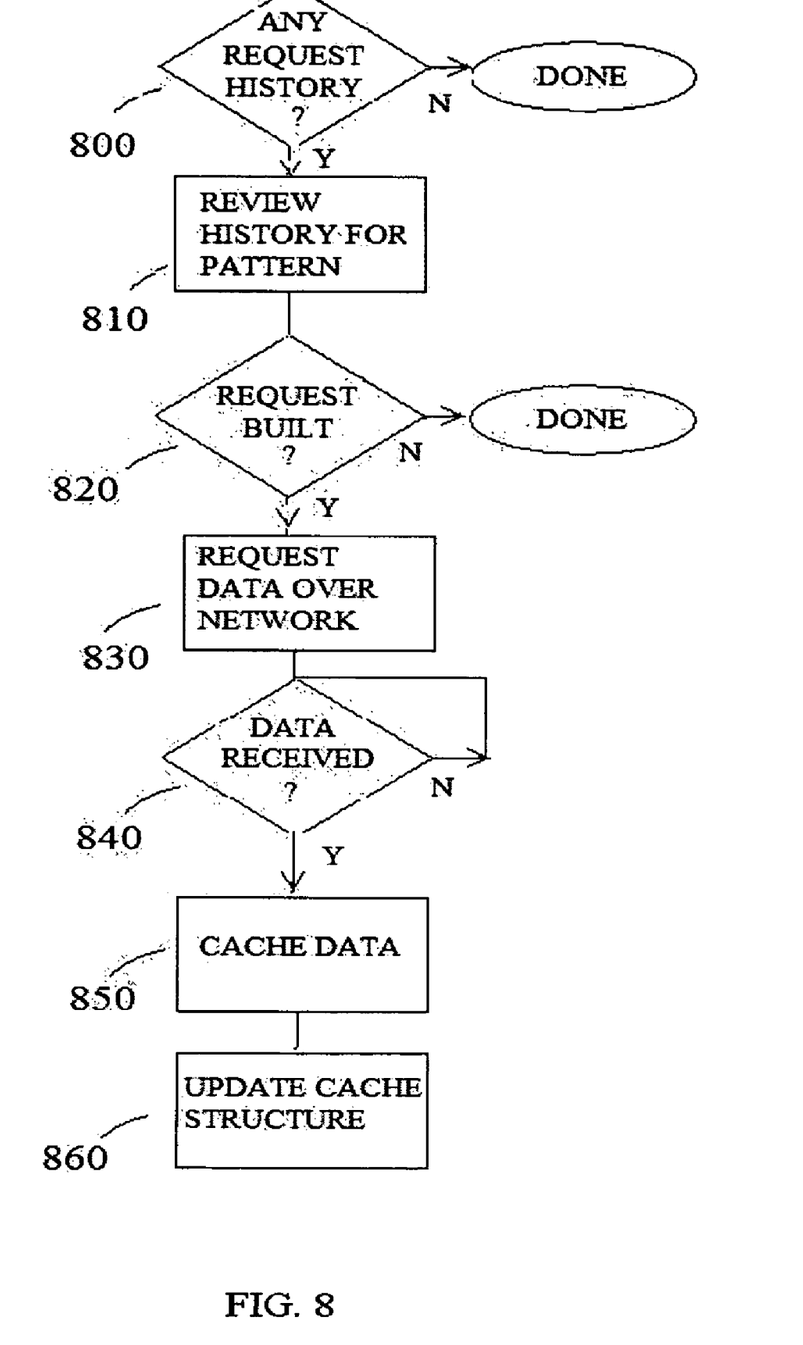
FIG. 8 is a flow-chart diagram useful in describing predictive data requests.

FIG. 5 is a block diagram of a computer system useful in describing aspects of the invention shown in FIGS. 6, 7 and 8. For the sake of clarity, a peer-to-peer network node exposing available content object information to remote network nodes and responsive to requests for the content object information is referred to as a "remote server node." A "local control node" refers to a peer-to-peer network node communicating with a remote server node, supporting user input requests or internal node requests, outputting content object information, and optionally content, in response to requests.

With reference to FIG. 5, local control node 500 communicates with remote server node 506 using network 510. Control node 500 includes processing unit 501, memory 503, network interface 502, embedded user input module 504 and embedded output module 505. Alternatively, user input module 504 may be external to local control node 500 as described above in reference to FIG. 3 (e.g. remote control unit 340).

Output module 505 may be external to local node 500 as described above in reference to FIG. 3 (e.g. TV 380). Processing unit 501 may be a microcontroller or microprocessor available from vendors such as Intel, AMD, Motorola, Texas Instruments and others. In addition to user interface and network interface processing, processor unit 501 performs aspects of the present invention as described below and flow charted in FIGS. 6, 7 and 8.

Network interface 502 provides access to network 510 and may be a networking chip or a network interface card supporting wired or wireless network connectivity.

Processing unit 501 is coupled to memory 503. Memory 503 stores cached content object information and contains a control structure data to manage and access the cached content information. Optionally, memory 503 may store content objects and application data for processing unit 501. Preferably memory 503 is a random access memory (RAM) but could be one of or a combination of RAM, integrated storage, such as a disc, external storage device or removable storage device.

Remote server node 506 includes processing unit 508, network interface 507 and memory 509. Processing unit 508 may be a microcontroller or microprocessor available from such vendors as described above. As described in reference to network interface 502, network interface 507 functions to access network 510 and may also be a networking chip or a network card providing wired or wireless network connectivity.

Memory 509 stores content object information and optionally other data such as application data and/or content objects for processing unit 506. Memory 509 is RAM but could be one of or a combination of RAM, integrated storage such as a disc, external storage device or removable storage device.

One exemplary embodiment of the invention caches content object information in anticipation of requests from a user or processes internal to the local control node. According to this embodiment, the processing unit requests the content object information from the remote server node, receives and stores the requested data to local control node memory as described below with respect to FIG. 6 steps 620, 630, 640 and 650. The local node becomes a virtual mirror of the remote node with respect to the content object information. Local requests for data can then be filled from the local remote memory thereby eliminating network access to satisfy the request. Furthermore, if another remote node requests the same content object information, it may be satisfied from the memory 509 of the remote note as well as from the server on which the content resides.

The exemplary caching system may use both cache memory and cache control information for cache management. Minimally, the processor unit indicates if remote node data is stored in the cache memory. There are numerous ways to store this control information. Examples are flags and pointers. Where multiple data sets can be stored in local node cache memory, the processor unit may determine what data is stored and where it is stored. Should the memory become full, any or all cache data may be deleted from memory. Preferably, the least frequently used cached data is deleted first so that more frequently accessed cached data remains available. In order to determine the cached data to delete, additional control data is helpful to determine, for example, how often or how recently content object information has been accessed to determine the best cache data to remove. The receipt time of the cached data, the remote node identifier and the last time the data was retrieved are other examples of such helpful data. Collectively, cache management data is referred to as the "cache control structure."

Additionally, the exemplary caching system uses some management functions. Where multiple data sets can be stored in local node cache memory, the processor unit searches its local cache memory for the requested data. When cache memory is full, the processor unit may free cache memory for new data. Moreover, the processor may invalidate the cache entry when the data stored in the corresponding remote server node changes.

There are several ways the processor unit can invalidate cache memory entries. One method is a timer. Upon expiration of the timer, the processor unit invalidates the cache control structure to reflect that the cache is empty. Under UPnP, the Media Server CDS function provides additional methods. In one method, the processor unit queries or polls the remote server node for status using the GetSystemUpdateID function defined for UPnP CDS. In one exemplary method, the local control node subscribes to, or registers with the remote server node to receive CDS event notifications such as SystemUpdateId or ContainerUpdateId. A SystemUpdateId event indicates that the CDS changed while ContainerUpdateId event indicates that a content container has changed. When a change event occurs, the remote server node sends the notification to the Control Point, and the Control Point invalidates the cache memory or at least an entry in the cache memory corresponding to the changed CDS entry.

In another exemplary embodiment of the invention, the processor unit of the local control node determines if a data request can be filled from cache memory as flow charted in FIG. 6. At step 600, a request for content object information is processed. Typically, the request is generated in response to user input but may originate from another process within node 600. At step 610, the processor scans the cache control structure in local control node memory for an entry that satisfies the data request of step 600. If an entry is found, the associated cached data is retrieved from memory at step 670. Otherwise, at step 620, the processor issues a network data request through the network interface for the requested content object information. At step 630, the processor waits for the requested data. When the data is received, it is stored in local control node cache memory at step 640.

At step 650, the cache control structure is updated to indicate the presence of the cached data. Optionally, in the case of multiple cached data sets, once data from cache memory is retrieved at step 670, additional control data such as the last reference time is updated at step 650 for cache full memory management as described above. Furthermore, the cache may maintain a history of received requests for use with anticipatory cache requests, as described below.

At step 660, the requested data is processed. Where the content object information request at step 600 is initiated by user input, the data may be formatted and displayed, for example, on a Media Renderer or on a dedicated display attached to the device (e.g. a LCD display on a portable audio device). In the case of a data request originating from an internal node process, the data is returned to the requesting process.

Preferably, the steps of FIG. 6 are implemented in several program processes or threads. This modularizes the processing and ensures that all processing is not stopped waiting for a single event or remote node data to arrive as can be the case for network requests. For data requests initiated by user input, a user interface process builds the data request at step 600, and processes the requested data at step 660. For internal node requests, the requesting process may build a data request 600 and process the requested data at step 660. Steps 610, 670, 640 and 650 are performed by a cache management process. Steps 620 and 630 are processed by a network communication thread. Events or messages are passed between the processes to perform the functions of FIG. 6.

In accordance with yet another exemplary embodiment of the invention, FIG. 7 is a flow chart for a method of caching whereby the processor unit of the local control node resizes a request in anticipation of a future request. In general, the method involves determining the probability or likelihood that data in addition to the requested content object information will be requested in the future. If this probability is greater than a threshold (e.g. 50 percent), the request is resized and any identified additional content object information is added to the original request. In FIG. 7 steps 720, 730 and 780 address this aspect of the present invention. For other steps, processing is similar to that of the similarly named steps of FIG. 6 discussed above. Specifically, steps 700, 710 and 790 match steps 600, 610 and 670 respectively. Steps 740, 750, 760 and 770 match steps 620, 630, 640 and 650 respectively.

At step 720, the processor unit examines and possibly resizes the data request. One factor in determining whether to resize a request is the size of the request itself. For example, the increased time to retrieve six items over that of retrieving three items can add a small amount of additional time to the one request which is much less than the amount of time for two additional requests for two items.

Another determining factor for resizing is ordering of the requested data output. Where the initial request is for data likely to be displayed consecutively such as in a listing of content object information, often it is more efficient to revise the request size. Consider a content object information list of 30 available movie titles and the user browsing items 11-20. Because it is common for a user to page down or up through the list of 30 title items, it is advantageous at step 730 to resize the request to retrieve items 1-30 as the list is displayed consecutively. Here, increasing the request size eliminates the need for two entire message requests for items 1-10 and 21-30 as well as the additional packet overhead in returning data for these two requests. The size of the resize request is not limited to the entire list. It is contemplated that smaller resize operations may also provide benefit. In the above scenario, for example, when the user accesses items 11-20 it may be assumed that he or she has no interest in items 1-10 and the request may be resized to encompass only items 11-30.

The advantages of this technique are best illustrated in view of exemplary peer-to-peer network FIG. 4. Integrated user display 450 in this embodiment may be, for example, the display of a hand-held device. If so, a user page down request during browsing uses less data to fill the small hand-held device screen. Because there is less data on the screen, it is more likely the user will be paging down or up more often to see the titles. By caching the entire list of titles, or at least a larger subset of the list, further network requests may be reduced or eliminated.

Resizing the request does use additional processing when the data for the resized request arrives at step 760. All or part of the data can be cached, but at step 780, only the data responsive to the original request at step 700 is processed. As described above with respect to FIG. 6, modularity and process flow may make it desirable to implement the steps of FIG. 7 in several program processes or threads.

Referring now to FIG. 8, predictive message requesting uses past message requests to predict a future request. The predictive request is issued and the data is stored to local control node memory. In order to review past requests, the processor unit may store the original requests, such as those of FIG. 6 step 600 and FIG. 7 step 700, to local node memory referred to as "request history memory." The processor unit performs the steps of FIG. 8 periodically, during processor idle time, after a data request is processed by the requester, such as in step 660 of FIG. 6 and step 780 of FIG. 7, or as part any data request. Preferably, predictive caching is performed during idle time when the processor unit is not servicing data requests. At step 800, the processor determines if a recently satisfied request corresponds to a request that was previously stored in the request history memory. If so at step 810, the processor unit reviews the request history memory for a pattern.

Among the recognized patterns is repeated user requests for page up or page down through a content object information list of items. In this case, where an initial request for items 1-20 is followed by a request for items 21-40, the processor unit generates a predictive data request for items 41-60 as a data request for these items is likely.

Figure 9:
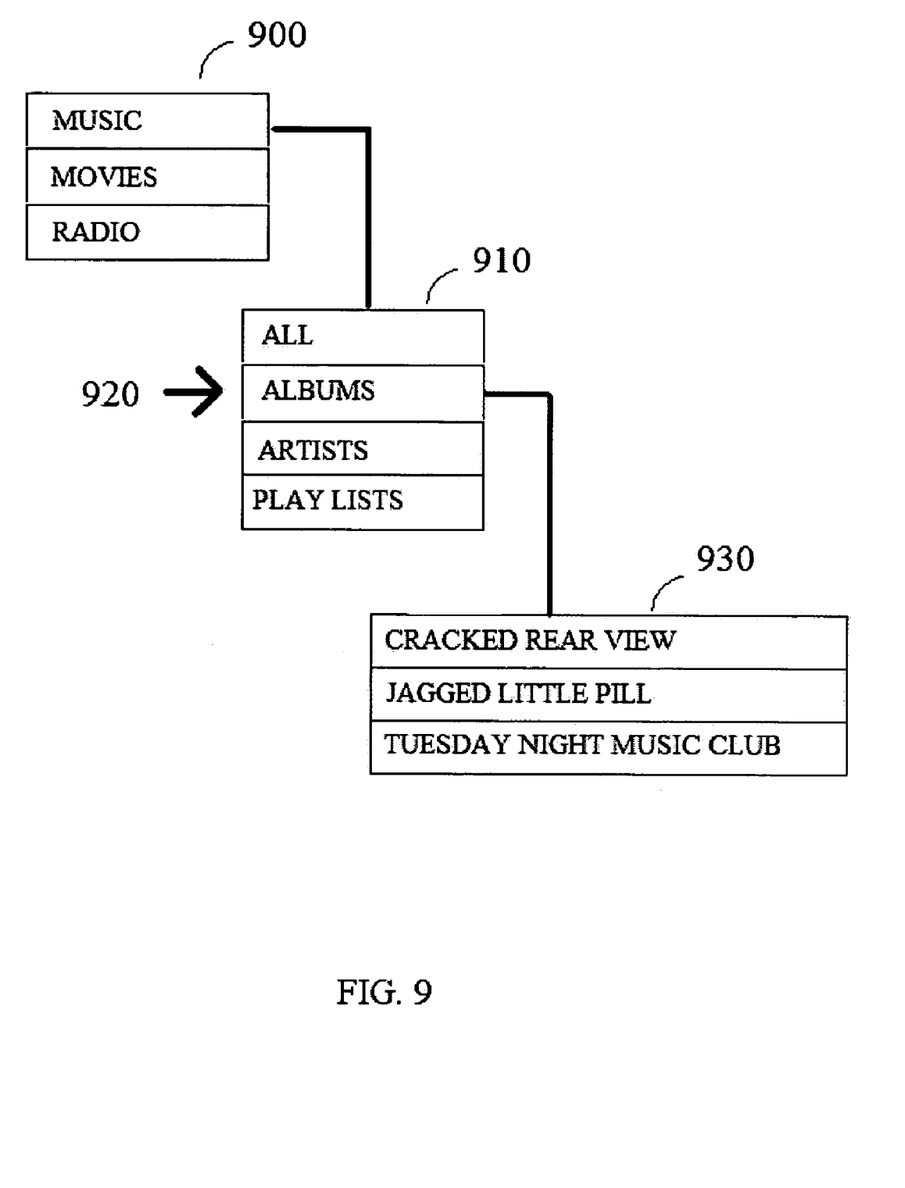
FIG. 9 is a data structure diagram that is useful for describing hierarchical predictive requests.

Another recognized pattern is caching items in a hierarchical content object information listing. Referring now to FIG. 9, consider top level list 900 with items "Music", "Movies" and "Radio". Each of the top level list 900 items may have items or "children" within that category. For example, selection of "Music" reveals the children in intermediate list 910 items "All", "Albums", "Artists" and "Play Lists." Further, if item 920 "Albums" is selected, bottom level list 930 is exposed with album items "Cracked Rear View", "Jagged Little Pill" and "Tuesday Night Music Club." In accordance with this aspect of the invention, when the user highlights or moves a pointer over an item, but has yet to select the item, the processor predicts that the lower level may be selected and peremptorily requests and caches the content object information for the lower level. In this example, lower list 930 is cached for possible presentation upon selection of item 920. Although this example addresses caching the lowest level information in the hierarchy, often termed "drilling down", this caching can be performed at any level of the hierarchy. Accordingly, highlighting item "Music" in top level list 900 causes intermediate list 910 items to be cached.

Referring again to FIG. 8, if at step 820, the processor unit recognizes a pattern, a network request for the data is issued at step 830, preferably through a network communication thread. At step 840, the processor unit waits for arrival of the request content object information. Once this data is received, at step 850 the data is stored to cache memory and at step 860, the cache structure is updated.

It is contemplated that the invention may be implemented in software that may run on the processor 501 and memory 503 of the local node shown in FIG. 5. In this embodiment of the invention, the software may be embodied in a carrier such as an optical or magnetic disc, a memory card or an audio frequency, radio frequency or optical carrier wave.

It is understood that the drawings and descriptions herein are offered by way of example to facilitate understanding of the invention. It is understood by those skilled in the art that various changes in form can generate additional embodiments and modifications without departing from the spirit and scope of the invention.

The invention claimed is:

1. A method of satisfying a request for content object information within a peer-to-peer network, the method comprising:

in response to a request for the content object information, determining if the requested content object information is stored in a cache memory of a local node and retrieving the content object information from the cache memory of the local node; and if the requested content object information is determined not to be stored in the cache memory of the local node:

resizing the request for the content object information with other content object information responsive to determining a likelihood that the other content object information will be requested meets or exceeds a factor;

requesting the content object information and the other content object information from a remote node;

receiving the requested content object information including the other content object information from the remote node; and storing the received content object information including the other content object information in the cache memory of the local node;

wherein requesting the content object information from the remote node further includes receiving the requested content object information from the remote node when the requested content object information is determined to be found in the remote node or receiving the requested content object information from a second remote node when the requested content object information is determined to be found in the second remote node through a reference to the second remote node from the first remote node.

2. The method according to claim 1, wherein the peer-to-peer network is a Universal Plug and Play (UPnP) network and the content object information is content object information provided according to Content Directory Services (CDS) of the UPnP network.

3. The method according to claim 1, further including:
receiving an invalidating event from the remote node, the invalidating event indicating that at least one of the content object information entry in the remote node has been changed;
determining if the at least one content object information entry is in the cache memory of the local node; and
if the at least one content object information entry is in the cache memory of the local node, marking the at least one content object entry invalid in the cache memory of the local node.

4. The method according to claim 1, wherein storing the received content object information in the cache memory of the local node includes:
determining if the cache memory of the local node is full; and
if the cache memory of the local node is full:
identifying one content object information entry in the cache memory of the local node that is less likely to be accessed than another content object information entry in the cache memory of the local node; and
storing the received content object information in place of the identified content object information entry.

5. The method according to claim 4, wherein identifying the one content object information entry in the cache memory that is less likely to be accessed than the other content object information entry in the cache memory of the local node includes:
determining how recently each content object information entry has been accessed; and
identifying a least recently accessed content object information entry as the identified one content object information entry.

6. The method according to claim 4, wherein identifying the one content object information entry in the cache memory that is less likely to be accessed that is lower than the another content object information entry in the cache memory of the local node includes:
determining how frequently each content object information entry in the cache memory of the local node has been accessed; and
identifying a least frequently accessed content object information entry as the identified one content object information entry.

7. The method according to claim 1, wherein the resizing the request for the content object information includes requesting content object information items that are adjacent to the requested content object information in the remote node.

8. The method according to claim 1, wherein the resizing the request for the content object information includes determining if the requested content object information is from an ordered set of content object information entries and requesting content object information from the ordered set.

9. The method according to claim 1, wherein the resizing the request for the content object information includes determining if the requested content object information is from a hierarchically ordered set of content object information entries and requesting content object information lower in the hierarchy of the hierarchically ordered set of content object information entries.

10. The method according to claim 1, further including storing a history of requests for content object information in the local node;
wherein, if the request for content object information is in the history of requests for content object information, resizing the request includes requesting other content object information in the history of requests for content object information.

11. A method of preemptively requesting and caching content object information within a peer-to-peer network, the method comprising:
resizing a request for base content object information responsive to determining a likelihood that additional content object information of the base content object information will be requested by a local node in the future meets or exceeds a factor;
if it is determined that it is likely that the additional content object information of will be requested, determining if the base and additional content object information is stored in a cache memory of the local node and retrieving the base and additional content object information from the cache memory of the local node; and
if the base or additional content object information is determined not to be stored in the cache memory of the local node:
requesting the base or additional content object information from a remote node;
receiving the requested base or additional content object information from the remote node; and
storing the received base or additional content object information in the cache memory of the local node;
wherein requesting the base or additional content object information from the remote node further includes receiving the requested base or additional content object information from the remote node when the requested base or additional content object information is determined to be found in the remote node or receiving the requested base or additional content object information from a second remote node when the requested base or additional content object information is determined to be found in the second remote node through a reference to the second remote node from the first remote node.

12. The method according to claim 11, wherein the peer-to-peer network is a Universal Plug and Play (UPnP) network and the base and additional content object information is content object information provided according to Content Directory Services (CDS) of the UPnP network.

13. The method according to claim 11, wherein resizing includes determining if the additional content object information is adjacent to other content object information in the remote node that was requested by the local node.

14. The method according to claim 11, wherein resizing includes determining if the additional content object information is from an ordered set of content object information entries and requesting other content object information from the ordered set.

15. The method according to claim 14, wherein resizing is responsive to navigation of a hierarchical menu having multiple levels and further includes requesting content object information at a lower menu level than a level currently being navigated.

16. The method according to claim 11, further including storing a history of requests for content object information in the local node;
wherein, if a prior request for content object information is in the history of requests for content object information, the determining the likelihood that the item of content object information will be requested includes requesting content object information in the history of requests for content object information.

17. An apparatus for use in a peer-to-peer network having a local node on which content object information may be displayed and a remote node including a content directory including the content object information, the apparatus comprising:
a cache memory component in the local node for storing items of content object information requested by the local node; and
a processor component that retrieves requested content object information from the cache memory of the local node when the content object information is determined to be in the cache memory of the local node and, when the requested content object information is determined not to be stored in the cache memory of the local node:
resizes the request for the content object information with other content object information responsive to determining a likelihood that the other content object information will be requested meets or exceeds a threshold;
requests the content object information and the other content object information from a remote node;
receives the requested content object information or the other content object information from the remote node when the requested content object information or the other content object information is determined to be found in the remote node, otherwise receives the requested content object information or the other content object information from a second remote node through a reference to the second remote node from the first remote node; and
stores the received content object information in the cache memory of the local node.

18. A computer readable storage medium including computer program instructions, the instructions causing a computer to perform a method of satisfying a request for content object information within a peer-to-peer network, the method comprising:
in response to a request for a content item, determining if content object information for the requested content object is stored in a cache memory of a local node;
retrieving the content object information from the cache memory of the local node when the content object information is determined to be in the cache memory of the local node; and
if the requested content object information is determined not to be stored in the cache memory of the local node:
resizing the request for the content object information with other content object information associated with the content object information responsive to determining a likelihood that the other content object information will be requested meets or exceeds a factor;
requesting the content object information and the other content object information from a remote node;
receiving the requested content object information from the remote node; and
storing a the received content object information in the cache memory of the local node;
wherein requesting the content object information from the remote node further includes receiving the requested content object information from the remote node when the requested content object information is determined to be found in the remote node or receiving the requested content object information from a second remote node when the requested content object information is determined to be found in the second remote node through a reference to the second remote node from the first remote node.

19. A computer readable storage medium including computer program instructions, the instructions causing a computer to perform a method of preemptively requesting and caching content object information within a peer-to-peer network, the method comprising:
determining whether a likelihood that an item of content object information will be requested by a local node meets or exceeds a predetermined factor;
resizing a request for the item with other items of content object information responsive to the determining the likelihood;
if it is determined that it is likely that the item of content object information will be requested, determining if the item of content object information is stored in a cache memory of the local node and retrieving the content object information from the cache memory of the local node; and
if the item of content object information is determined not to be stored in the cache memory of the local node:
requesting the item of content object information from a remote node;
receiving the requested content object information from the remote node; and
storing the received content object information in the cache memory of the local node;
wherein requesting the item of content object information from the remote node further includes receiving the requested item of content object information from the remote node when the requested item of content object information is determined to be found in the remote node or receiving the requested item of content object information from a second remote node when the requested item of content object information is determined to be found in the second remote node through a reference to the second remote node from the first remote node.

* * * * *

UNITED STATES PATENT AND TRADEMARK OFFICE
CERTIFICATE OF CORRECTION

| | | |
|---|---|---|
| PATENT NO. | : 7,571,167 B1 | Page 1 of 1 |
| APPLICATION NO. | : 10/868110 | |
| DATED | : August 4, 2009 | |
| INVENTOR(S) | : Campana et al. | |

It is certified that error appears in the above-identified patent and that said Letters Patent is hereby corrected as shown below:

On the Title Page Item (56) (U.S. Patent Documents), line 3, after "Land et al." insert -- 715 --.

Item (56) (U.S. Patent Documents), line 4, after "Nelson" insert -- 463 --.

Item (56) (U.S. Patent Documents), line 12, after "Spring et al." insert -- 715 --.

At column 10, line 33, Claim 11, after "information" delete "of".

At column 12, line 12, Claim 18, after "storing" delete "a".

Signed and Sealed this
Eighth Day of March, 2011

David J. Kappos
*Director of the United States Patent and Trademark Office*